United States Patent
Berner et al.

(10) Patent No.: US 9,176,945 B1
(45) Date of Patent: Nov. 3, 2015

(54) EXTRACTING DATA FROM MESSAGES FOR MULTIPLE ACCOUNTS

(71) Applicants: Mikael Berner, Los Altos, CA (US);
 Kesava Neeli, San Jose, CA (US);
 Yuanhao Wu, Guangzhou (CN); Guibin Zhou, Guangzhou (CN); Liangping Li, Guangzhou (CN)

(72) Inventors: Mikael Berner, Los Altos, CA (US);
 Kesava Neeli, San Jose, CA (US);
 Yuanhao Wu, Guangzhou (CN); Guibin Zhou, Guangzhou (CN); Liangping Li, Guangzhou (CN)

(73) Assignee: Easilydo, Inc., Mountain View, CA (US)

( * ) Notice: Subject to any disclaimer, the term of this patent is extended or adjusted under 35 U.S.C. 154(b) by 0 days.

(21) Appl. No.: 14/215,366

(22) Filed: Mar. 17, 2014

Related U.S. Application Data

(60) Provisional application No. 61/793,685, filed on Mar. 15, 2013.

(51) Int. Cl.
 *G06F 17/27* (2006.01)
(52) U.S. Cl.
 CPC .................................. *G06F 17/2705* (2013.01)
(58) Field of Classification Search
 CPC . G06Q 10/10; G06Q 10/107; G06Q 30/0269;
  G06F 17/30864; G06F 17/30867; G06F 17/27;
   G06F 17/21; G06F 17/211; G06F 17/248
 USPC ...................... 709/203, 205, 219; 704/8–9, 2,
   704/E11.001, E15.001, 231; 707/E17.014,
   707/E17.108, 14.66; 705/14.53; 715/234,
     715/243, 204, 256
 See application file for complete search history.

(56) References Cited

U.S. PATENT DOCUMENTS

| | | | |
|---|---|---|---|
| 6,259,444 B1 | 7/2001 | Palmer et al. | |
| 6,865,546 B1 | 3/2005 | Song | |
| 7,333,976 B1 * | 2/2008 | Auerbach et al. ..................... | 1/1 |
| 7,881,971 B1 | 2/2011 | Nguyen et al. | |
| 7,979,319 B2 | 7/2011 | Toulotte | |
| 2002/0016956 A1 | 2/2002 | Fawcett | |
| 2002/0143664 A1 | 10/2002 | Webb | |
| 2002/0178078 A1 | 11/2002 | OToole | |
| 2002/0194379 A1 | 12/2002 | Bennett et al. | |
| 2006/0045067 A1 * | 3/2006 | Dezonno et al. .............. | 370/352 |
| 2007/0161382 A1 * | 7/2007 | Melinger et al. .......... | 455/456.1 |
| 2007/0244976 A1 | 10/2007 | Carroll et al. | |
| 2009/0276284 A1 | 11/2009 | Yost | |
| 2010/0023341 A1 | 1/2010 | Ledbetter et al. | |
| 2010/0179961 A1 | 7/2010 | Berry et al. | |
| 2010/0217645 A1 | 8/2010 | Jin et al. | |
| 2010/0241483 A1 | 9/2010 | Haynes et al. | |
| 2010/0268830 A1 | 10/2010 | McKee et al. | |
| 2011/0093360 A1 | 4/2011 | Nguyen et al. | |

(Continued)

OTHER PUBLICATIONS

Non-Final Office Action, Mar. 27, 2013, U.S. Appl. No. 13/423,102, filed Mar. 16, 2012.
Final Office Action, Jul. 18, 2013, U.S. Appl. No. 13/423,102, filed Mar. 16, 2012.
Non-Final Office Action, May 30, 2014, U.S. Appl. No. 13/423,102, filed Mar. 16, 2012.

(Continued)

*Primary Examiner* — Marivelisse Santiago Cordero
*Assistant Examiner* — Stephen M Brinich
(74) *Attorney, Agent, or Firm* — Carr & Ferrell LLP

(57) ABSTRACT

Provided are computer implemented methods and systems for extracting data. According to a method, a message associated with one of several accounts is received. The message is processed to detect one or more key words. A template related to the one or more key words is determined. The template is associates one or more portions of the message with one or more tags. Based on the determining, the data from the message is extracted using the template.

20 Claims, 7 Drawing Sheets

(56) References Cited

U.S. PATENT DOCUMENTS

| | | | |
|---|---|---|---|
| 2012/0016817 A1 | 1/2012 | Smith et al. | |
| 2012/0072835 A1* | 3/2012 | Gross et al. | 715/243 |
| 2012/0158815 A1* | 6/2012 | Kelly et al. | 709/201 |
| 2012/0221563 A1 | 8/2012 | De et al. | |
| 2012/0265655 A1* | 10/2012 | Stroh | 705/30 |
| 2012/0271676 A1 | 10/2012 | Aravamudan et al. | |
| 2012/0278127 A1 | 11/2012 | Kirakosyan et al. | |
| 2013/0073568 A1* | 3/2013 | Federov et al. | 707/749 |
| 2013/0246524 A1 | 9/2013 | Berner et al. | |
| 2013/0247055 A1 | 9/2013 | Berner et al. | |
| 2014/0195605 A1 | 7/2014 | Kallayil | |

OTHER PUBLICATIONS

Non-Final Office Action, Dec. 24, 2014, U.S. Appl. No. 13/423,102, filed Mar. 16, 2012.

Final Office Action, Apr. 28, 2015, U.S. Appl. No. 13/423,102, filed Mar. 16, 2012.

Non-Final Office Action, Apr. 3, 2014, U.S. Appl. No. 13/422,769, filed Mar. 16, 2012.

Non-Final Office Action, Sep. 15, 2014, U.S. Appl. No. 13/422,769, filed Mar. 16, 2012.

Final Office Action, Jan. 23, 2015, U.S. Appl. No. 13/422,769, filed Mar. 16, 2012.

Non-Final Office Action, Jun. 9, 2015, U.S. Appl. No. 13/422,769, filed Mar. 16, 2012.

* cited by examiner

400

DEFINING KEYWORDS
410

Keyword: sender:"cs.bestwestern.com" AND subject:"Reservation Confirmation"

Found 50 emails

| Sender | Subject | Date |
|---|---|---|
| <reservations.bestwestern.com> | Best Western - Reservation Confirmation | Fri, 13 Dec 2013 21:32:42 -0700 |
| <reservations.bestwestern.com> | Best Western - Reservation Confirmation | Wed, 4 Dec 2013 13:55:59 -0700 |
| <reservations.bestwestern.com> | Best Western - Reservation Confirmation | Sat, 30 Nov 2013 09:51:37 -0700 |
| <reservations.bestwestern.com> | Best Western - Reservation Confirmation | Thu, 21 Nov 2013 10:04:35 -0700 |
| <reservations.bestwestern.com> | Best Western - Reservation Confirmation | Mon, 11 Nov 2013 07:25:08 -0700 |

FIG. 4

EXTRACTED DATA ⟵ 600

| b_checkout_date | | |
|---|---|---|
| #Start Position# | #End Position# | checkout_date |
| 2220 | 2276 | 12/22/13 |

| b_phone | | |
|---|---|---|
| #Start Position# | #End Position# | phone |
| 2021 | 2048 | 562/599-5555 |

| b_checkin_time | | |
|---|---|---|
| #Start Position# | #End Position# | checkin_time |
| 2164 | 2220 | 12/22/13 |

| b_address | | |
|---|---|---|
| #Start Position# | #End Position# | address |
| 1886 | 2030 | <br>1725 Long Beach Boulevard<br>Long Beach, California<br>90813-1931, United States<br> |

| b_checkin_date | | |
|---|---|---|
| #Start Position# | #End Position# | checkin_date |
| 2164 | 2220 | 12/21/13 |

| b_checkout_time | | |
|---|---|---|
| #Start Position# | #End Position# | checkout_time |
| 2220 | 2276 | 11:30 |

FIG. 6

EXTRACTING DATA FROM MESSAGES FOR MULTIPLE ACCOUNTS

RELATED APPLICATIONS

The present application claims the benefit of U.S. provisional application No. 61/793,685, filed on Mar. 15, 2013. The subject matter of the aforementioned application is incorporated herein by reference for all purposes.

FIELD

This application relates generally to data processing and, more specifically, to extracting data from messages associated with multiple accounts.

BACKGROUND

With the development of mobile or other computing devices, more and more routine aspects of life are facilitated by applications and services associated with mobile or other computing devices. Mail, SMS, chat, and other messages can contain important data, such as purchase data, digital receipts, flight or train reservation confirmations, hotels or car rentals, concerts or events, restaurants reservations, bill payment reminders, and so forth. Since users often have multiple email or message service accounts, the above-mentioned information can be spread across multiple accounts. This impedes locating desired information. Moreover, large volumes of messages within an email account can further complicate data retrieval.

SUMMARY

Provided are computer-implemented methods and systems for extracting data. A system for extracting data can include a processor and a database in communication with the processor. The processor can be configured to receive a message associated with one of several user accounts and process the message to detect one or more key words. A template related to the one or more key words can be determined. The template can be associated with one or more portions of the message using one or more tags. Based on the determination, the data from the message is extracted using the template. The database can be configured to store at least the template and the one or more key words.

Further provided is a computer-implemented method for extracting data. According to the method, a message associated with one of user accounts is received. The message can be processed to detect one or more key words. A template related to the one or more key words is determined. The template can be associated with one or more portions of the message using one or more tags. Based on the determination, the data from the message can be extracted using the template.

Further provided is a machine-readable medium involving instructions, which when implemented by one or more processors, perform the following operations. One of these operations involves receiving a message associated with one of accounts. The email message can be processed to detect one or more key words. A template related to the one or more key words can be determined. The template can be associated with one or more portions of the message using one or more tags. Based on the determination, the data from the message can be extracted using the template. The database can be configured to store at least the template and the one or more key words.

BRIEF DESCRIPTION OF DRAWINGS

Exemplary embodiments are illustrated by way of example and not limitation in the figures of the accompanying drawings, in which like references indicate similar elements.

FIG. 4 is a diagram illustrating defining key words for a template.

FIG. 6 is a diagram illustrating extracted data.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented systems and methods for extracting data from email, SMS, or chat messages are described herein. Large volumes of information associated with user applications and services pose problems associated with timely processing of the information and responding to user requests. Keeping track of all appointments, reservations, notification, reminders, and other tasks a user has to perform daily can be difficult. Email is one of the most important sources of information for a user. However, multiple email accounts and large volumes of messages can impede locating desired information and force a user spend a lot of time reviewing email messages. Moreover, the user can receive information from other sources ranging from SMS messages to web page notifications. A system for extracting data from messages provides a way to efficiently process data from the messages associated with multiple accounts, categorize the messages based on specific domains or senders, and extract data according to user-defined templates. Using these templates, a user can tag messages and extract the desired data. A template can include a set of tags associated with specific sections of a message.

Figure 1:
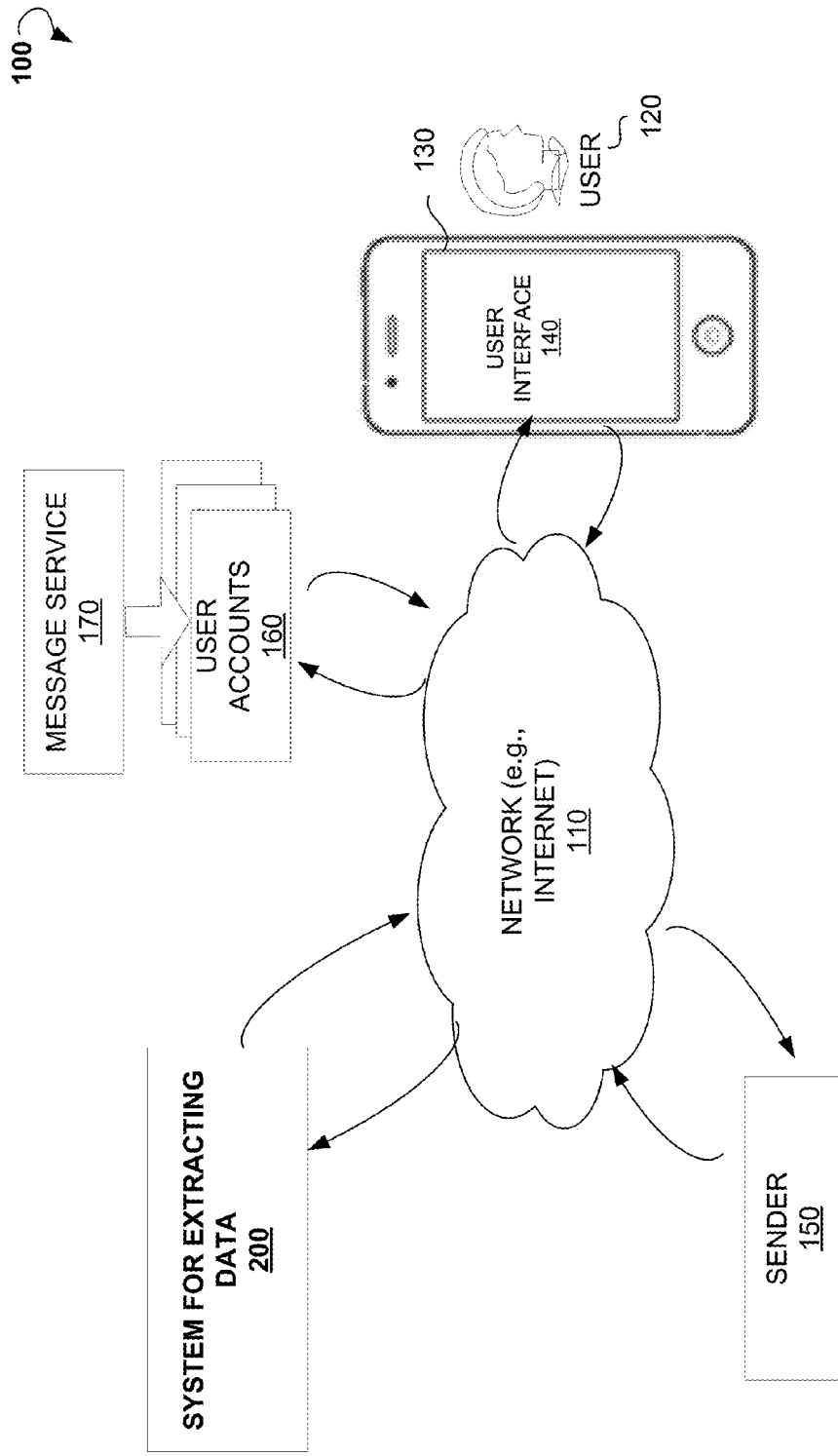
FIG. 1 is a block diagram illustrating an example environment within which a system for extracting data from messages can be implemented.

Referring now to the drawings, FIG. 1 illustrates an environment 100 within which the systems and methods for extracting data from messages can be implemented. The environment 100 shows a system for extracting data 200(also referred to herein as "system 200"), a network 110, a user 120, a client device 130 capable of providing a user interface 140, a sender 150, and user accounts 160 associated with one or more message services 170.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 can be a network of data processing nodes that are interconnected for the purpose of data communication.

The system for extracting data 200 can include the user interface 140 that can be displayed by the client device 130 of the user 120. The system for extracting data 200 can reside on a cloud-based server or on the client device 130. Though the client device 130 illustrates a smart phone, the client device 130 can include any other computing device, such as a mobile phone, a tablet PC, a laptop, a personal computer, and so forth. The client device 130, in some exemplary embodiments, can include a Graphical User Interface (GUI) for displaying the user interface 140. In a typical GUI, instead of offering only text menus or requiring typed commands, the system presents graphical icons, visual indicators, or special graphical elements called widgets that can be utilized to allow the user 120 to interact with the user interface 140. The client device 130 can be configured to utilize icons used in conjunction with text, labels, or text navigation to fully represent the information and actions available to users.

The user 120 can specify one or more user accounts 160, from which the system for extracting data 200 can receive email messages for data extraction. Additionally, the user 120 can create one or more templates which can be used to define a data scheme for specific mail types. In order for the system 200 to determine which template to use automatically, the user 120 can specify one or more key words for each template. Moreover, the user can set a language of the template. For example, the user 120 can create a template for car rental confirmations for a specific vendor and the language of the template can be Spanish. A keyword for the template can be a name of the vendor or a domain name used to communicate with the vendor. The system for extracting data 200 can determine the language of the received message and skip all templates with other languages, detect the keyword in the message and automatically apply a corresponding template to the message.

The system for extracting data 200 can communicate with user accounts residing both on the client device 130 and on the network 110. The system for extracting data 200 can continuously receive incoming messages from the user accounts 160 specified by the user 120 for data extraction. The received messages can be processed by the system for extracting data 200 using one or more templates defined by the user 120. As a result of the processing, structured data can be received and provided to the user 120.

Figure 2:
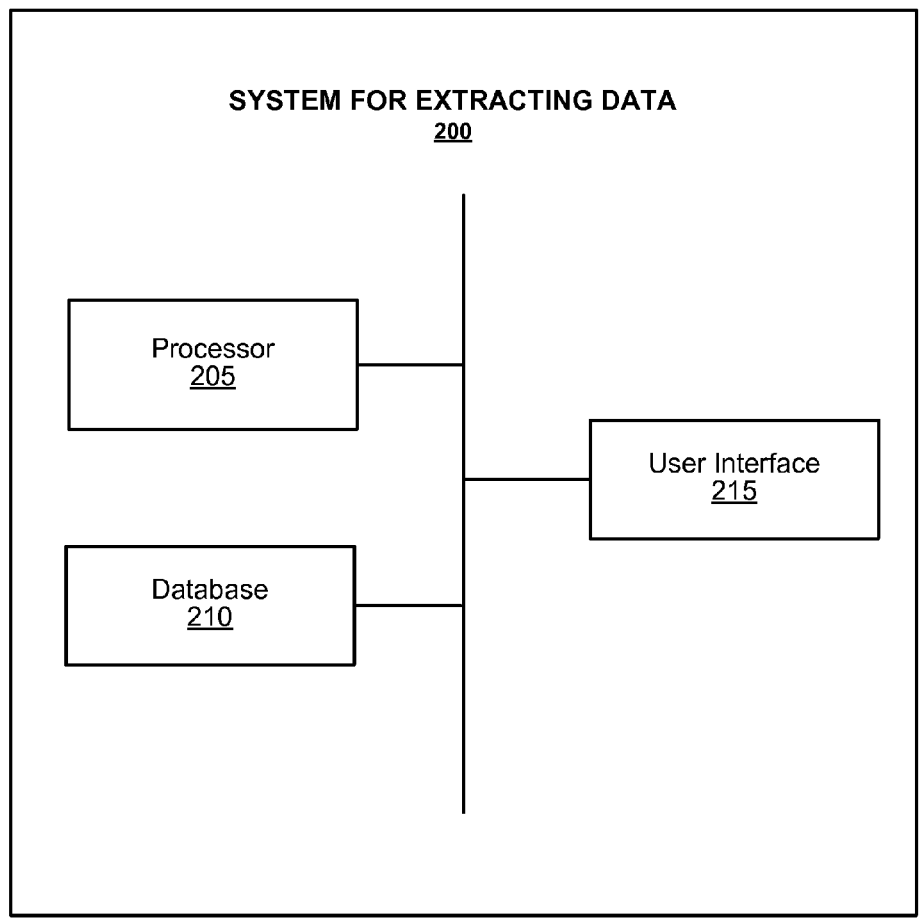
FIG. 2 is a block diagram showing components of a system for extracting data from messages.

FIG. 2 is a block diagram showing various example modules of a system for extracting data 200. Specifically, the system for extracting data 200 can include a processor 205, a database 210, and a user interface 215. The processor 205 can include a programmable processor, such as a microcontroller, central processing unit (CPU), and so forth. In other embodiments, the processor 205 can include an application-specific integrated circuit (ASIC) or programmable logic array (PLA), such as a field programmable gate array (FPGA), designed to implement the functions performed by the system for extracting data 200. The processor 205 can be configured to continuously or periodically receive email messages from email accounts of a user. The processor 205 can further be configured to process the messages using templates. The processor 205 can determine a template used for extracting data from a specific message by detecting one or more key words in the email message. When the template is determined, the processor 205 can extract portions of the message and store them with specific tags as defined by the template.

The database 210 can be configured to store at least the extracted data, the templates defined by the user along with the key words associated with each template, and so forth. The extracted data is stored as a part of user task data/cards.

In some embodiments, the system for extracting data 200 can also include the user interface 215 configured to visualize data associated with the system for extracting data 200. The system for extracting data 200 can be a component of a system for automating tasks using a smart agent. The system for extracting data 200 can extract data to be used by the system for automating tasks using a smart agent. The extracted data can be converted into automation tasks with the help of one or more smart agents.

In one embodiment, the system for extracting data 200 is capable of detecting an HTML email with specific information. In an example embodiment, the tool can include a browser plugin. The plugin may allow a user to select and tag specific fields in an email or on a web page. The plugin can create a template code that extracts information for all emails associated with a specific vendor. This approach can provide a common parser for checking shipment emails and applying vendor specific template extraction code.

In another embodiment, the system for extracting data 200 can locate an email or another message that matches a task performed by a smart agent (e.g., paying bills, making or scheduling a shipment, and so forth). The system for extracting data 200 can provide a drop-down menu comprising a list of algorithms for selection and execution of the algorithms. Users may view the extraction output. Optionally, the output may include a debugging mode. Other embodiments may utilize discovery algorithms which depend on emails extracted from specific headers. Embodiments of the system 200 may include an option to send an email to any email test account with a single click.

In one embodiment, the system 200 can be configured to perform realtime discovery using an algorithm and to propose a task based on the email or another message.

Figure 3:
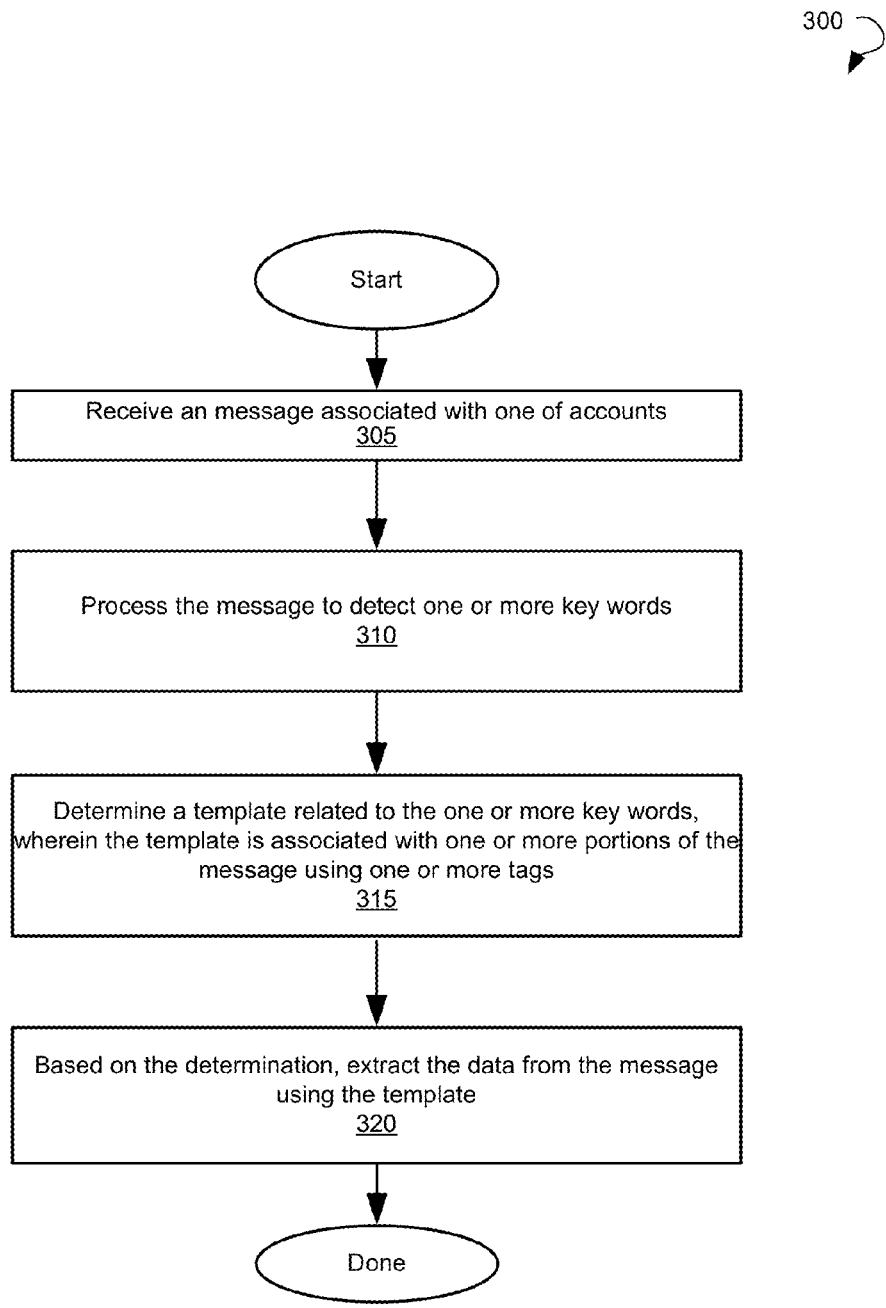
FIG. 3 is a flow chart illustrating a method for extracting data from messages.

FIG. 3 is a flow chart illustrating a method for extracting data 300, in accordance with certain embodiments. The method 300 can be performed by logic that can comprise hardware (e.g., dedicated logic, programmable logic, and microcode), software (such as software run on a general-purpose computer system or a dedicated machine), or a combination of both. In one example embodiment, the processing logic resides on the system for extracting data 200, and the various elements of the system 200 can perform the method 300. It will be appreciated by one of ordinary skill that examples of the foregoing modules can be virtual, and instructions said to be executed by a module can, in fact, be retrieved and executed by software. Although various components can be configured to perform some or all of the various operations described herein, fewer or more components can be provided and still fall within the scope of various embodiments.

As shown in FIG. 3, the method 300 can commence at operation 305 with receiving a message associated with one of accounts of the user associated with the system 200. The user can specify accounts in various message systems for data extraction, for example, email accounts, accounts associated with social networks, online services, SMS, chats, and so forth. For example, the online services can include shipping vendor web sites like USPS, UPS, FedEx, DHL, RoyalMail, and so forth. The system 200 can extract a shipment status from the web sites and provide the shipment status to the user as structured information.

The received message can be processed at operation 310 to detect one or more key words associated with templates. The key words can include vendor names, domain names associated with a vendor, specific message subjects, and so forth. When one or more key words are detected, the system for extracting data 200 can determine a template connected to the key words at operation 315. If no key words are detected in the messages, the message can be flagged as an untagged and unprocessed message. Additionally, the system for extracting data 200 can flag the message as having incomplete tags, broken, modified format, and so forth.

In some embodiments, the user can define language-specific templates. To simplify locating the template for a message, the system 200 can optionally identify the language of the message and preselect the templates for the language.

To determine a language and/or domain, machine learning models can be used. The models can be resource-intensive, so to facilitate usage, the machine learning models can be stored on a shared pool of remote servers. Message processing units associated with the user and/or other users can access the machine learning models to identify domains and/or languages of messages received by accounts of the user and/or other users.

Moreover, the user can assign categories for messages based on the domain related to the sender. Thus, the user can sort messages to view separately, for example, hotel reservations, online purchases, event confirmations, and so forth. When the template is determined, the template can be automatically applied to the message. The template can include definitions of message portions with corresponding tags for each portion so that the system 200, at operation 320, can extract corresponding portions of the message and store the corresponding portions with the related tags. The extracted data can be stored as structured information. The structured information can be provided to the user via a user interface through a website, an application, and so forth.

In some embodiments, the user can share the extracted data with specific users or groups of users. Thus, users can collaborate on and/or discuss the extracted data.

Additionally, the extraction can include contacts extracted from email or other messages. The system 200 can detect signature blocks in emails and extract contact name, title, address, and phone numbers. Using the sender email ID, the system 200 can also search for contacts in the user base associated with the system 200. Even without signature blocks, smart extraction algorithms can allow extraction of data from crowd sourced data. Information extracted from various sources (email and other related fields from crowd sourced data) can be combined and provided to the user.

Figure 5:
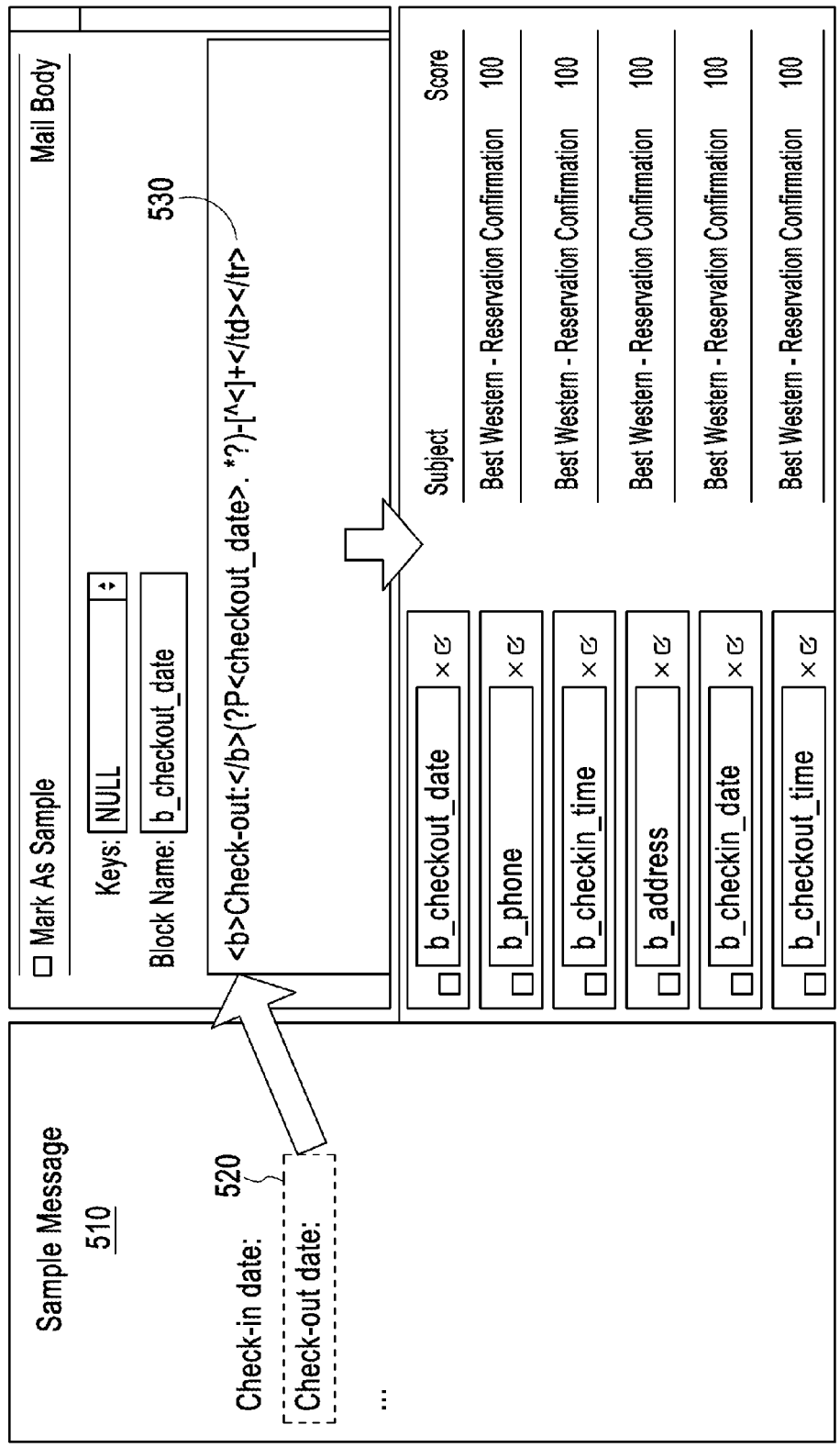
FIG. 5 is a diagram illustrating creation a template.

FIGS. 4-5 illustrate creating and validating templates, viewing structured data, and monitoring extraction quality using email messages as an example. FIG. 4 illustrates an example screen 400 showing key words defined for creation of a template, in accordance with some example embodiments. The user can specify one or more key words 410 for a template to be created. The key words 410 can be intended for specific data fields, such as sender, subject, or body of the message. Additionally, the user can apply various operators (e.g., AND, OR, NOT, and so forth) to describe relations between multiple key words. For example, the user can specify that an email message should be sent from domain "cs.bestwestern.com" and include the phrase "Reservation Confirmation" in the subject to be processed using the template to be created.

When the key words 410 are specified, the system 200 can locate all email messages corresponding to the key words 410. The user can then select one of the messages to create a template. Additionally, the user can provide parameters for the template, for example, a category, a language of the message, a sample email, and so forth.

FIG. 5 illustrates an example screen 500 showing a template creation process, in accordance with some example embodiments. The template can be created based in a sample message 510. The user can select a portion 520 in the sample message 510. Based on the selected portion 520, a block is generated. The user can substitute the text in the selected portion 520 with a tag 530. The tagged blocks are stored in the template. Once a template is created or edited, the template can be pushed into production in realtime without production deployment. Thus, any changes can be immediately applied and new emails associated with new vendors automatically detected and processed in real time. Moreover, any changes in the email format associated with the existing template can be detected in real time, so that the user can immediately repair the corresponding template.

FIG. 6 illustrates an example screen 600 showing extracted data, in accordance with some example embodiments. Multiple data blocks can be extracted by the template. Each block can include a tag, a start position, an end position of a block, and the extracted data for the block.

In some embodiments, each block can also include a regular expression to verify format of the extracted data. For example, the regular expression for the block "checkout_time" can specify the following format for the block: 15:00. If the data extracted by the block does not correspond to the format of the regular expression, an error may be generated. All errors can be calculated to provide a matching score for the email message extraction.

Information concerning processed emails and corresponding matching scores can be monitored and provided to the user via the user interface. Emails with missing or broken templates can be automatically flagged. Thus, the user can identify broken or unsuitable templates, fix the templates and auto-recover all affected emails. Auto-recovery of the affected emails as soon as the template is repaired can allow the user to preserve data in the emails received while the template was malfunctioning. In a high volume production environment, with millions of emails processed daily, any broken format can result in a loss of many potential tasks. Due to the auto-recovery, the user can still receive these tasks after the template is repaired.

Additionally, matching scores can allow validating the created template. To this end, the created template can be run against a set of related emails (i.e. the emails corresponding to the key words and language). Furthermore, the information extracted from emails or other sources can be shared by a user upon providing permission. The user can opt to have all bill information shared with one person and all flight information shared with another person or organization.

Figure 7:
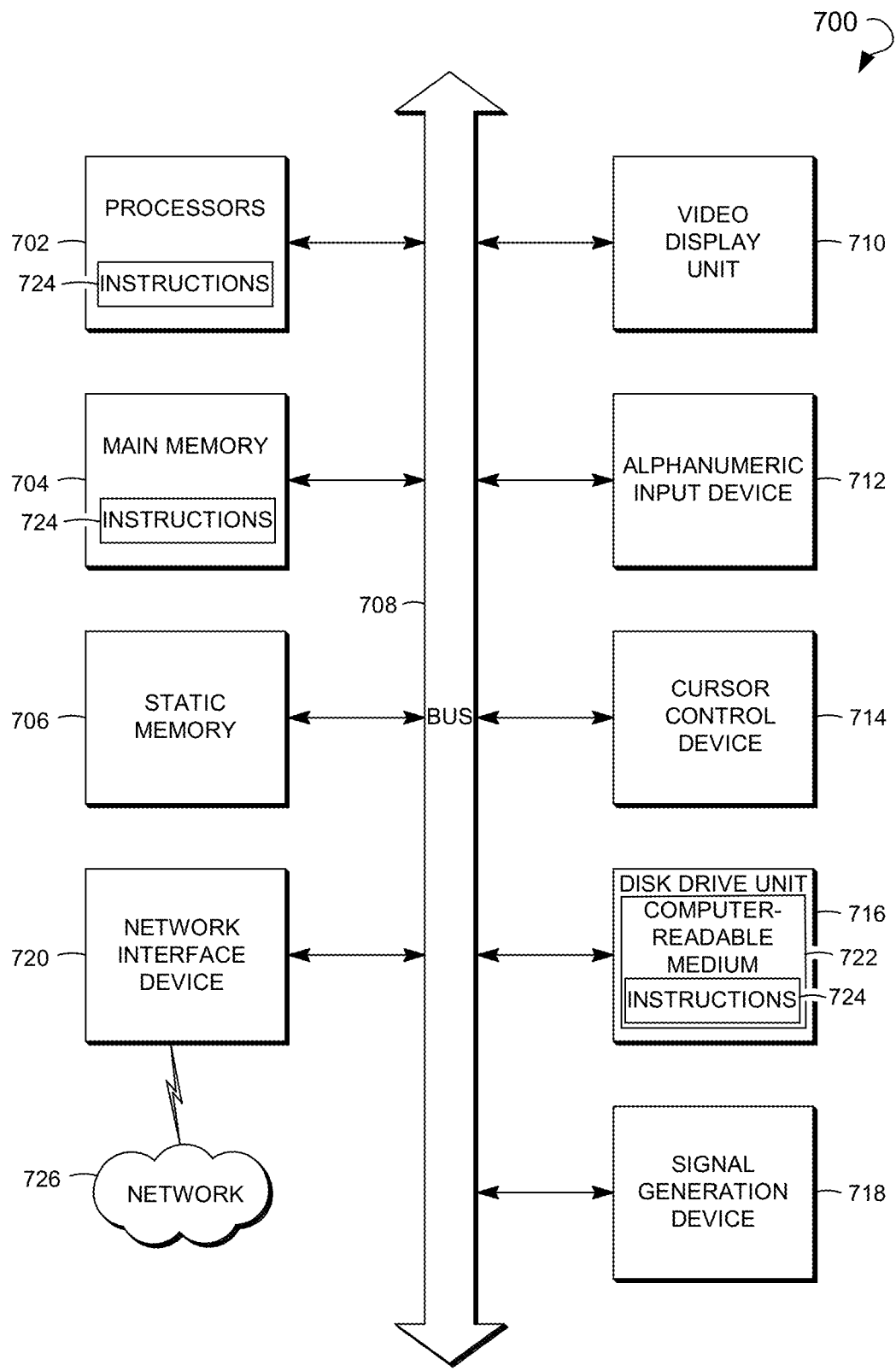
FIG. 7 shows a diagrammatic representation of a computing device for a machine in the exemplary electronic form of a computer system, within which a set of instructions for causing the machine to perform any one or more of the methodologies discussed herein can be executed.

FIG. 7 shows a diagrammatic representation of a computing device for a machine in the exemplary electronic form of a computer system, within which a set of instructions for causing the machine to perform any one or more of the methodologies discussed herein can be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 may also include an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory computer-readable medium 722, on which is stored one or more sets of instructions and data structures (e.g., instructions 724) embodying or utilized by any one or more of the methodologies or functions described herein. The instructions 724 may also reside, completely or at least partially, within the main memory 704 and/or within the processor(s) 702 during execution thereof by the computer system 700. The main memory 704 and the processor(s) 702 may also constitute machine-readable media.

The instructions 724 may further be transmitted or received over a network 726 via the network interface device 720 utilizing any one of a number of well-known transfer protocols (e.g., Hyper Text Transfer Protocol (HTTP)).

While the computer-readable medium 722 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

The components provided in the computer system 700 are those typically found in computer systems that may be suitable for use with embodiments of the present invention and are intended to represent a broad category of such computer components that are well known in the art. Thus, the computer system 700 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including UNIX, LINUX, WINDOWS, MAC OS, PALM OS, ANDROID, IOS (known as IPHONE OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), BLUE-RAY DISC (BD), any other optical storage medium, RAM, PROM, EPROM, EEPROM, FLASH memory, and/or any other memory chip, module, or cartridge.

What is claimed is:

1. A computer-implemented method for extracting data, the method comprising:
   receiving, by a processor, a message associated with at least one of a plurality of user accounts;
   processing, by the processor, the message to detect one or more key words;
   determining a template related to the one or more key words, wherein the template associates one or more portions of the message with one or more tags;
   based on the determining, extracting the data from the message using the template;
   determining a domain associated with the message, wherein the domain is determined using a plurality of domain learning models, the plurality of domain learning models residing on a shared pool of remote servers accessible by a user and other users; and
   based on the determining, categorizing the message.

2. The method of claim 1, wherein the message includes one or more of the following: an email message, a Short Message Service (SMS) message, a chat message, and a web page notification.

3. The method of claim 1, further comprising flagging the message as untagged based on the processing.

4. The method of claim 1, further comprising:
identifying a language associated with the message; and
based on the identifying, preselecting language-specific templates for the determining of the template.

5. The method of claim 1, further comprising, based on the extracting, flagging the message as one or more of the following: having incomplete tags, broken, and modified format.

6. The method of claim 1, wherein the user preliminary specifies the one or more key words related to the template.

7. The method of claim 1, wherein the user predefines the one or more portions of the message and associates the one or more portions of the message with the one or more tags.

8. The method of claim 1, wherein user modifications to the template are implemented in real time.

9. The method of claim 1, wherein the processing includes parsing of at least a text, a sender, and a subject of the message.

10. The method of claim 1, wherein the user is to specify the at least one of a plurality of user accounts and incoming messages to be processed to extract the data.

11. A system for extracting data, the system comprising:
a processor configured to:
receive a message associated with at least one of a plurality of user accounts;
process the message to detect one or more key words;
determine a template related to the one or more key words, wherein the template associates one or more portions of the message with one or more tags;
based on the determining, extract the data from the message using the template;
determine a domain associated with the message, wherein the domain is determined using a plurality of domain learning models, the plurality of domain learning models residing on a shared pool of remote servers accessible by a user and other users; and
based on the determination, categorize the message; and
a database in communication with the processor and configured to store at least the template, the data, and the one or more key words.

12. The system of claim 11, wherein the processor is further configured to flag the message as untagged based on the processing.

13. The system of claim 11, wherein the processor is further configured to:
identify a language of the message; and
based on the identifying, preselect language-specific templates for the determining of the template.

14. The system of claim 11, wherein the extracting includes contact extraction from the message.

15. A non-transitory computer-readable medium comprising instructions, which when executed by one or more processors, perform the following operations:
receive a message associated with at least one of a plurality of user accounts;
process the message to detect one or more key words;
determine a template related to the one or more key words, wherein the template associates one or more portions of the message with one or more tags;
based on the determining, extract the data from the message using the template;
determine a domain associated with the message, wherein the domain is determined using a plurality of domain learning models, the plurality of domain learning models residing on a shared pool of remote servers accessible by a user and other users; and
based on the determination, categorize the message.

16. A computer-implemented method for extracting data, the method comprising:
receiving, by a processor, a message associated with at least one of a plurality of user accounts;
processing, by the processor, the message to detect one or more key words;
determining a template related to the one or more key words, wherein the template associates one or more portions of the message with one or more tags;
based on the determining, extracting the data from the message using the template;
based on the extracting, detecting a match score, wherein the match score represents matching of the message to the template;
providing the match score to a user;
receiving, from the user, an adjustment of the template; and
based on the adjustment, re-extracting the data, wherein the re-extracting is performed automatically in real time.

17. The method of claim 16, wherein the message includes one or more of the following: an email message, a Short Message Service (SMS) message, a chat message, and a web page notification.

18. A computer-implemented method for extracting data, the method comprising:
receiving, by a processor, a message associated with at least one of a plurality of user accounts;
processing, by the processor, the message to detect one or more key words;
determining a template related to the one or more key words, wherein the template associates one or more portions of the message with one or more tags;
based on the determining, extracting the data from the message using the template;
providing the data to a user via a user interface based on the extracting;
receiving a user request to share the data with one or more other users, wherein the user selects an individual user or groups of users from the one or more other users, with which to share the data; and
based on the user request, sharing the data.

19. A system for extracting data, the system comprising:
a processor configured to:
receive a message associated with at least one of a plurality of user accounts;
process the message to detect one or more key words;
determine a template related to the one or more key words, wherein the template associates one or more portions of the message with one or more tags;
based on the determining, extract the data from the message using the template;
based on the extracting, detect a match score, wherein the match score represents matching of the message to the template;
provide the match score to the user;
receive, from the user, an adjustment of the template; and
based on the adjustment, re-extract the data, wherein the re-extracting is performed automatically in real time; and
a database in communication with the processor and configured to store at least the template, the data, and the one or more key words.

20. The system of claim 19, wherein the processor is further configured to flag the message as untagged based on the processing.

* * * * *